United States Patent [19]
Baravalle

[11] Patent Number: 5,377,888
[45] Date of Patent: Jan. 3, 1995

[54] CARRIER APPARATUS FOR THE TRANSPORT OF ARTICLES ON THE ROOF OF A MOTOR VEHICLE

[75] Inventor: Ugo Baravalle, Torino, Italy

[73] Assignee: FAPA S.p.A., Beinasco, Italy

[21] Appl. No.: 87,051

[22] Filed: Jul. 7, 1993

[51] Int. Cl.⁶ .............................................. B60R 9/00
[52] U.S. Cl. .................................... 224/309; 224/316; 224/322
[58] Field of Search ............... 224/309, 310, 314, 315, 224/316, 317, 318, 319, 320, 321, 322, 323, 324, 325, 326, 327, 328, 329, 330

[56] References Cited

U.S. PATENT DOCUMENTS

| | | | |
|---|---|---|---|
| 3,104,042 | 9/1963 | Gaus | 224/309 |
| 3,221,960 | 12/1965 | Gleason et al. | 224/326 |
| 4,609,133 | 9/1986 | Anderson | 224/329 |
| 4,747,529 | 5/1988 | Hindercker et al. | 224/314 |

FOREIGN PATENT DOCUMENTS

| | | |
|---|---|---|
| 3135649 | 3/1983 | Germany . |
| 3221126 | 12/1983 | Germany . |
| 091U000286 | 11/1991 | Italy . |
| 61-171636 | 8/1986 | Japan . |
| 62-268751 | 11/1987 | Japan . |

Primary Examiner—Henry J. Recla
Assistant Examiner—David J. Walczak
Attorney, Agent, or Firm—Sughrue, Mion, Zinn, Macpeak & Seas

[57] ABSTRACT

Carrier apparatus for the transport of articles on the roof of a motor vehicle, particularly an all-purpose carrier, a ski-carrier or the like, including a support structure having feet which bear on the side edge portions of the roof and at least one associated magnetic plate which can be applied to the roof to retain the apparatus thereon substantially without transmitting the load of the articles carried by the support structure to the roof, the transmission of the load being entrusted substantially only to the resting feet.

12 Claims, 6 Drawing Sheets

CARRIER APPARATUS FOR THE TRANSPORT OF ARTICLES ON THE ROOF OF A MOTOR VEHICLE

BACKGROUND OF THE INVENTION

The present invention relates to carrier apparatus for the transport of articles on the roof of a motor vehicle, particularly of an all-purpose carrier, ski-carrier or the like type, comprising a support structure having feet for resting on the side edge portions of the roof.

Apparatus of the above type is known in which the resting feet are provided with anchoring means for connecting the support structure rigidly to the side edges of the motor-vehicle roof during use. These known anchoring means often require complex adjustments in order to ensure that the support structure is fixed rigidly to the roof.

Transport devices are also known which have magnetic anchorages for enabling articles to be carried on a motor-vehicle roof and which can easily be mounted on the roof but these have the disadvantage of a limited load-bearing capacity because of the deformations which the loads themselves produce in the support zone which is substantially central of the roof.

SUMMARY OF THE INVENTION

The object of the present invention is to provide transport apparatus of the type defined at the beginning of the present description which is particularly convenient and easy to install on the roof of a motor vehicle by the user.

According to the invention, this object is achieved by virtue of the fact that the support structure has at least one associated magnetic plate which can be applied to the roof to retain the carrier apparatus thereon substantially without transmitting the load of the articles carried by the support structure to the roof, the load transmission being entrusted substantially only to the resting feet.

By virtue of this characteristic, the apparatus of the invention does not require the resting feet to have associated anchoring means and can be installed particularly simply and quickly by the user and also does not involve a risk of causing deformation to the motor-vehicle roof during use even when the loads transported are relatively large. This transport apparatus may also be removed from the motor-vehicle roof when it is not required for use and can be placed, for example, in the boot so as to occupy little space.

BRIEF DESCRIPTION OF THE DRAWINGS

The invention will now be described in detail with reference to the appended drawings, provided purely by way of non-limitative example, in which.

DETAILED DESCRIPTION OF THE INVENTION

Figure 1:
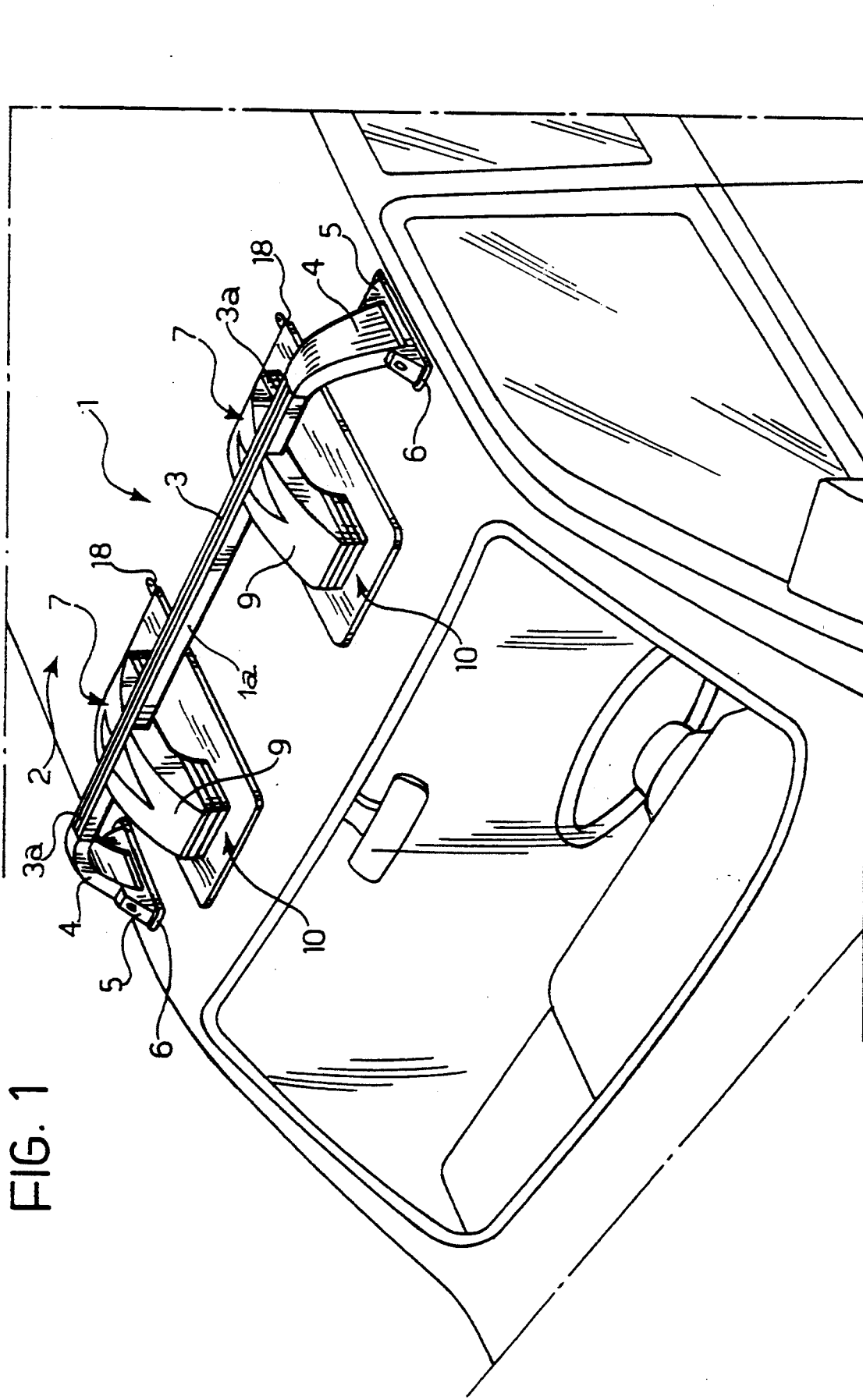
FIG. 1 is a perspective view of apparatus according to the present invention associated with the roof of a motor vehicle.

With reference to the drawings, apparatus is generally indicated 1 for the transport of articles on a motor-vehicle roof 2, formed, for example, by a pair of bars 1a (only one of which is shown in FIG. 1) disposed parallel to each other and transverse the roof 2. Each bar 1a, which serves as a support structure, comprises a cross-member 3 of telescopically variable length, to the ends 3a of which are rigidly connected feet 4 for resting on the side edge portions of the roof 2. The edges of the roof, which are structurally stronger than the central region of the roof 2, may support even high loads without undergoing appreciable deformation, unlike the central regions of the roof.

The resting feet 4 include respective bases 5 articulated thereto about axes substantially perpendicular to the crossmember 3 so that the bases 5 may adapt themselves perfectly to the curvature of the side edge portions of the roof 2. Each of the bases 5 carries a soft rubber pad 6 beneath it, the lower surface of which, which contacts the roof 2, is formed for example as a suction cup.

A pair of anchoring blocks 7 are located along the cross-member 3 and each comprises a cradle support member 8 and an outer fairing 9 shaped so as to improve the aerodynamic properties of the blocks 7.

Each block 7, as will be more fully clarified below, is associated therewith one or more magnetic plates 10 of known type, for example of the type known from Italian Patent Application No. T091U000286 in the name of the same applicant. Each block 7 may, for example, be carried by a single plate 10, as illustrated in FIG. 1, or by two separate plates 10 located one in front and one to the rear of the cross-member 3 as illustrated in FIG. 2.

Figure 2:
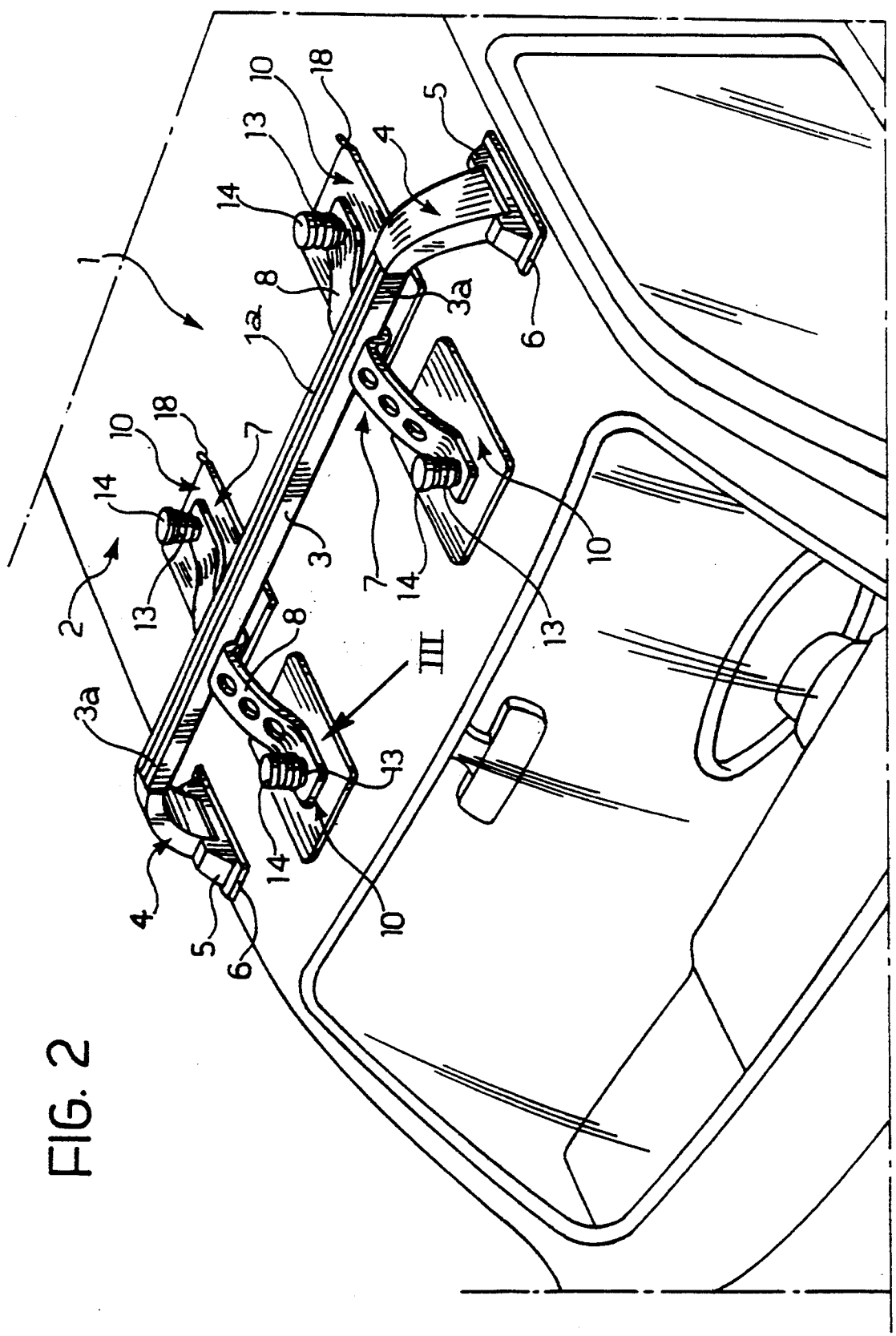
FIG. 2 illustrates a variant of FIG. 1 in which particular details of the device are shown.
Figure 3:
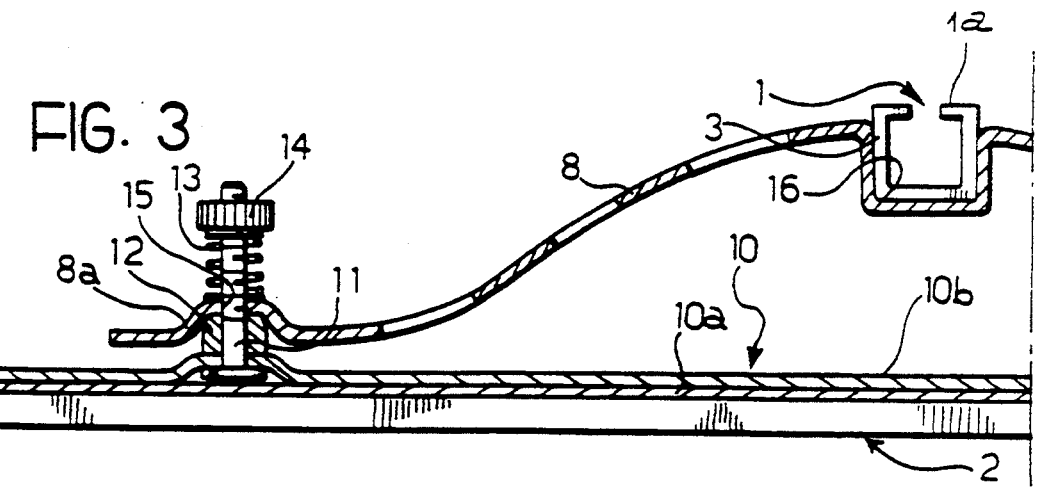
FIG. 3 is a partially-sectioned, enlarged side elevational view indicated by the arrow III of FIG. 2.

With reference to FIGS. 2 and 3, in which the blocks 7 are illustrated without their respective fairings 9, each magnetic plate 10 comprises a magnetic sheet 10a, which can be applied directly to the motor-vehicle roof 2 and is shaped to conform thereto, and a flexible metal base sheet 10b, fixed for example by gluing to the upper surface of the magnetic sheet 10a, having a gripper tongue 18 whose function is to facilitate the detachment of the plate 10, and hence of the blocks 7 connected thereto, from the motor-vehicle roof 2.

Each sheet 10b is formed with a hole which receives a screw 11 for connecting a base 8a of a cradle support element 8 to the respective sheet 10b.

Respective toroidal rings 12 of rubber or equivalent material are located coaxially around each of the screws 11 between a respective metal sheet 10b and cradle support 8 to serve as vibration dampers. The screws 11 are inserted in corresponding holes 15 in the bases 8a of each of the cradle supports 8 and are clamped by respective nuts 14 with the interposition of a helical spring 13 so as to provide a resilient connection between the supports 8 and the plates 10. Preferably each cradle support 8 rests with its bases 8a at two points located on opposite sides of the bar 3 and spaced therefrom so as to give the bar good stability longitudinally of the motor vehicle.

Each cradle support 8 has a seat 16 for receiving a cross-member 3 in an upper central region thereof. Beneath this central region, each cradle support 8 has a clamping device, of a type known per se and hence not illustrated, which enables the cross-member 3 to be connected rigidly to its support elements 8. Additional devices of known type (not illustrated) could also be provided for compensating for any misalignment of the two anchoring groups 7 transversely of the roof 2 of the motor vehicle.

Figure 4:
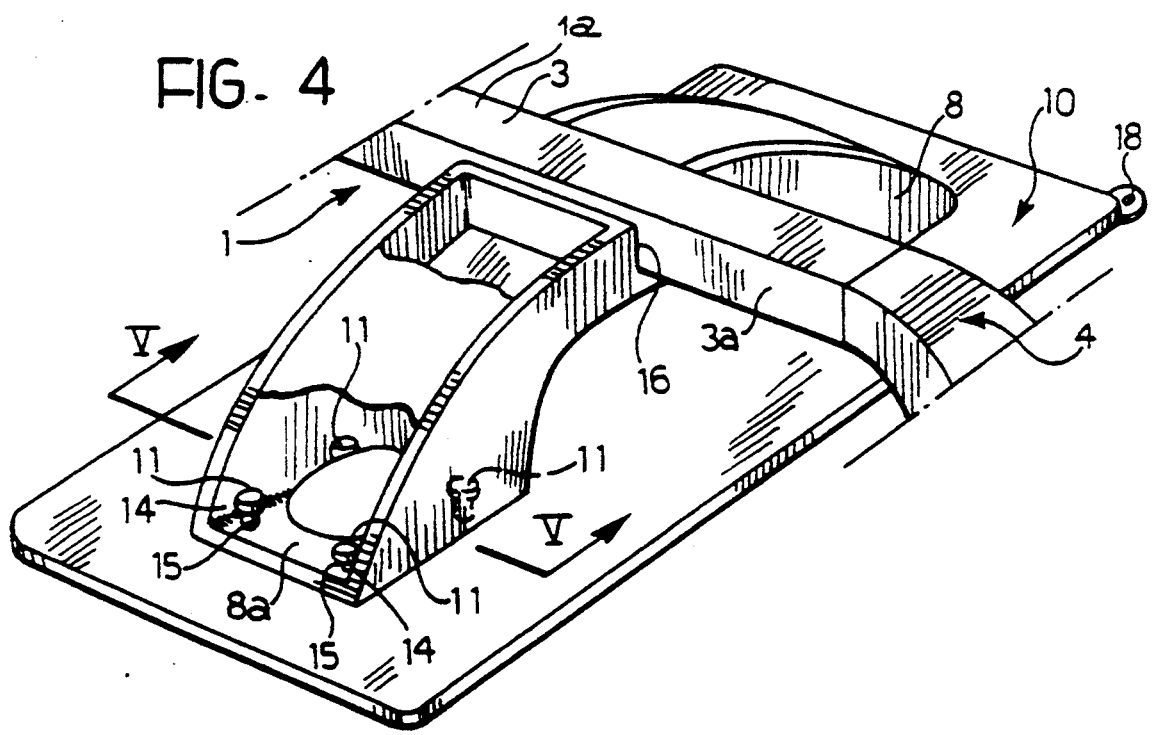
FIG. 4 is a perspective view of a variant of FIG. 2.
Figure 5:
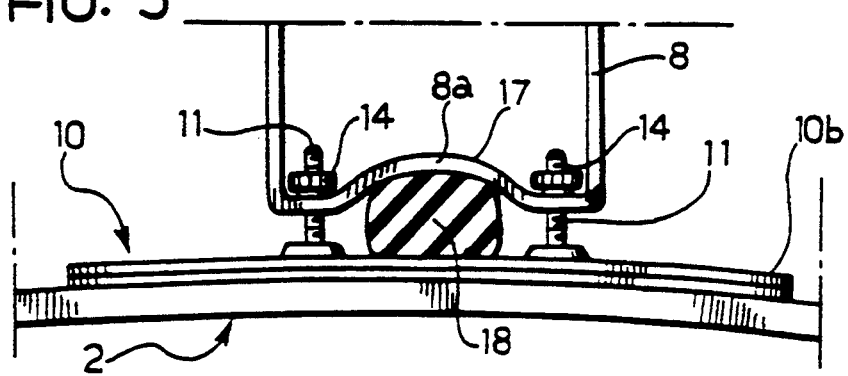
FIG. 5 is a front elevational view, partly sectioned along the line V—V of FIG. 4, and FIGS. 6, 7 and 8 are variants of the device of FIG. 1.

FIGS. 4 and 5 illustrate a variant of the cradle support 8 which, in this case, is formed by a box member whose two bases 8a have four holes 15 each engaged by a respective screw 11 clamped by a nut 14 and between which is formed a substantially dome-shaped projection 17. This dome-shaped projection 17 forms a seat for receiving a bearing 18 of elastomeric material, interposed between a sheet 10b and a base 8a, to serve as a vibration damper.

By virtue of this arrangement, the weight of the load supported by the bar is discharged almost entirely through the resting feet 4 of each of the cross-members 3 so as to avoid causing any deformation to the motor-vehicle roof 2, while the anchoring of the bar to the roof 2 is ensured by the groups 7.

The vibration damping supports which connect each of the bases 8a of the cradle elements 8 to the respective plate 10 prevent vibrations from being transmitted from the cross-member 3 to the roof 2.

Figure 6:
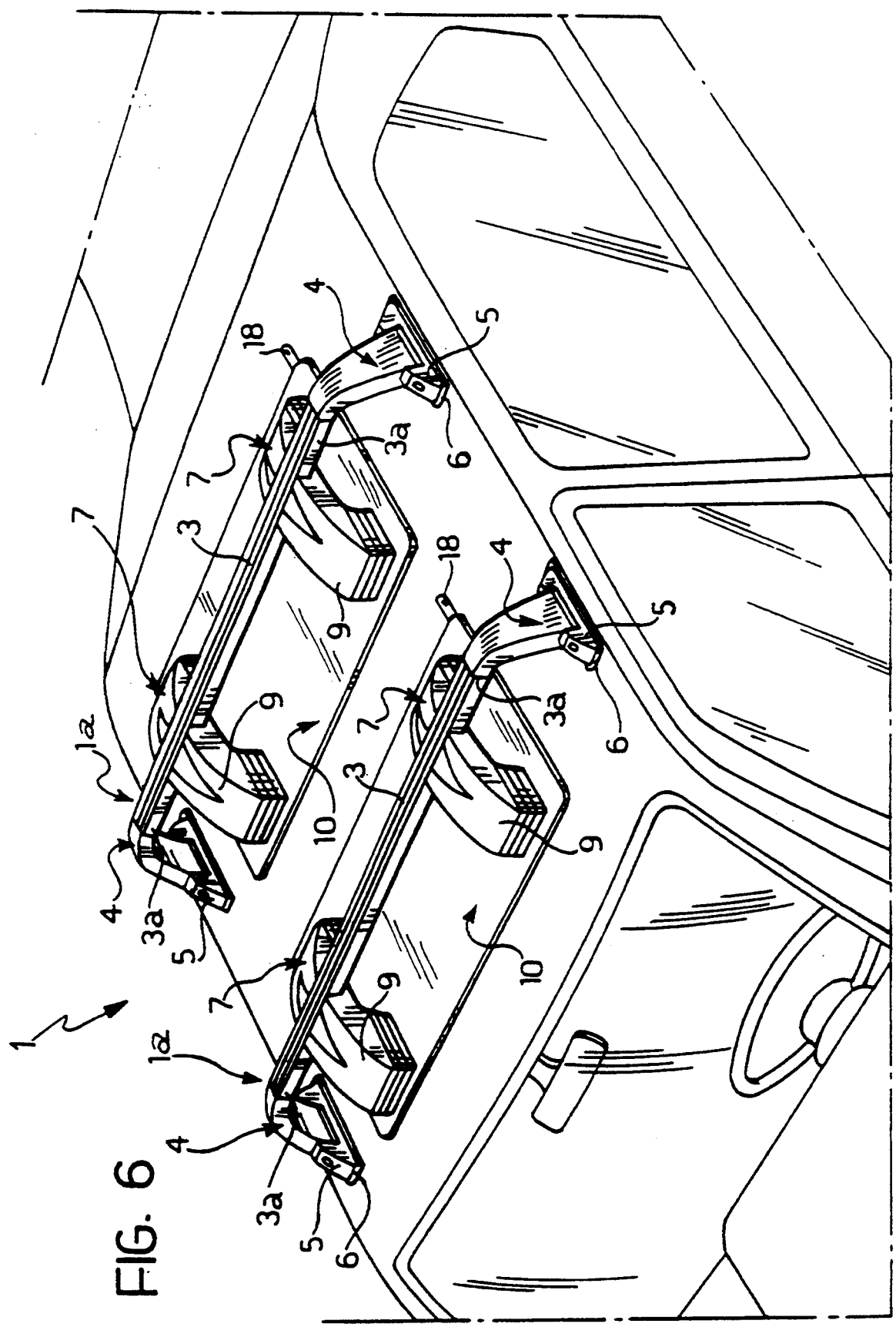

Various arrangements of the anchoring units 7 relative to the magnetic plates 10 are also possible. For example, a single anchoring unit 7 could be used for each cross-member 3, it being located substantially centrally of the cross-member 3, or several units 7 could be disposed in parallel on a single magnetic plate 10 extending transverse the motor-vehicle roof 2 according to the configuration illustrated in FIG. 6.

Figure 7:
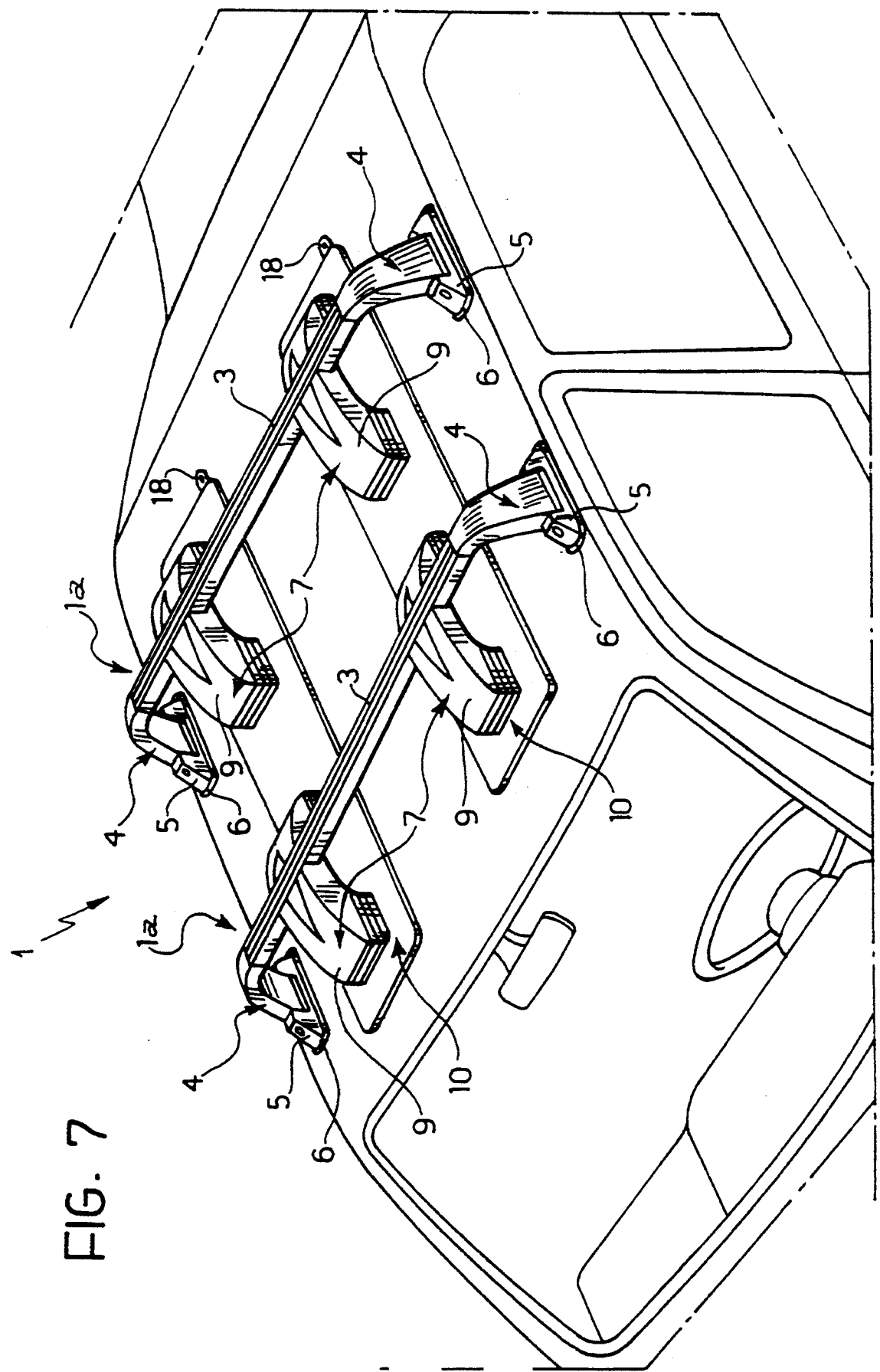

Alternatively a pair of anchoring units 7 could be disposed in longitudinal alignment on a pair of plates 10 disposed parallel to each other and extending longitudinally of the motor-vehicle roof 2 so that each anchoring group 7 supports a different cross-member 3, according to the configuration illustrated in FIG. 7.

The installation of the bars 1a requires the initial positioning of the plates 10 with their units 7 on the motor-vehicle roof 2 and then the insertion of the cross-members 3 in their respective seats 16 in the support elements 8. The tightening of the devices for clamping the cross-members 3 to the blocks 7 completes the anchoring of the cross-members 3 to the roof 2.

Figure 8:
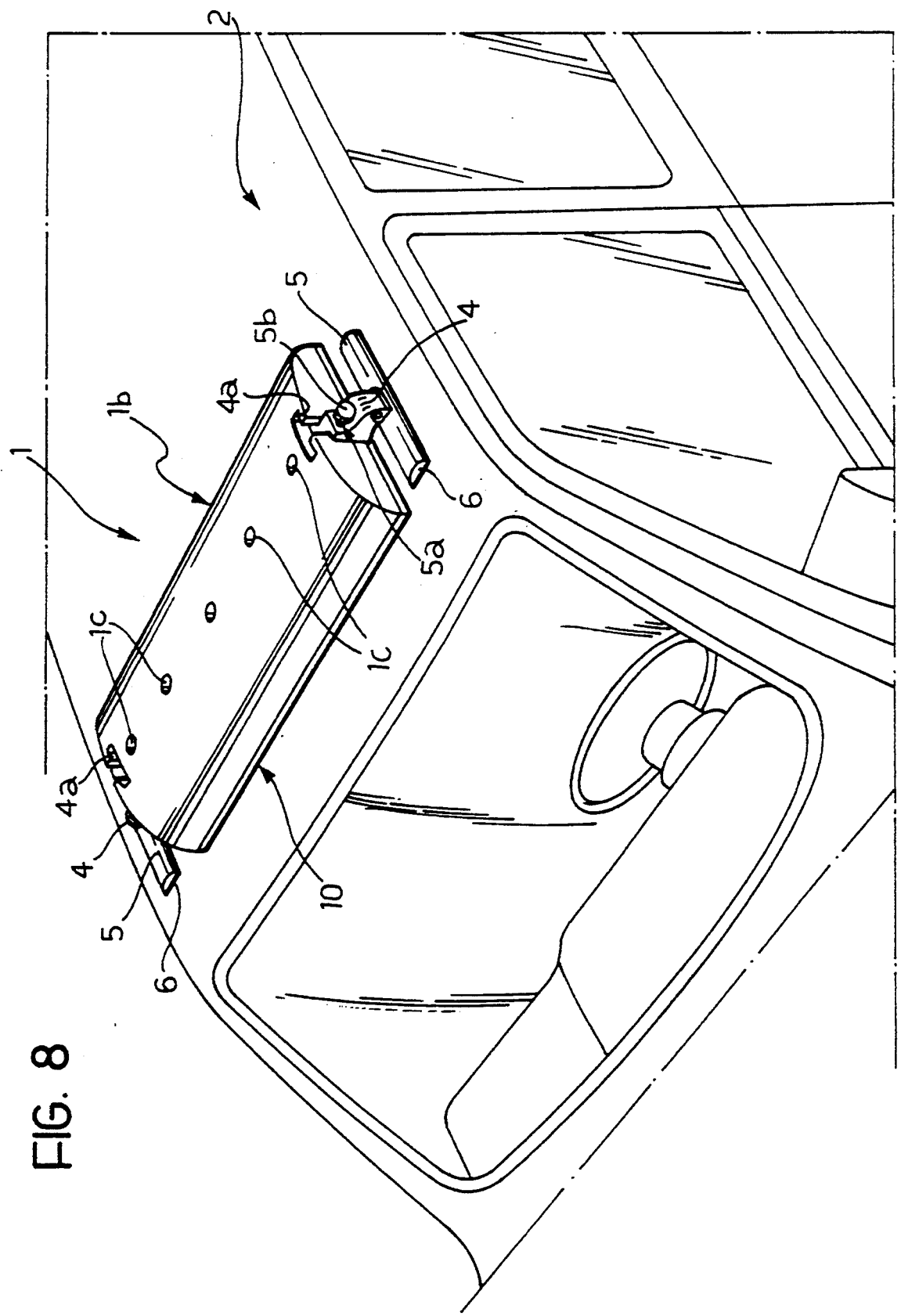

In a variant of the invention illustrated in FIG. 8, the apparatus 1 preferably includes a pair of elongate bodies 1b of half-shell or bell shape (only one of which is visible in FIG. 8) both anchored magnetically by means of a respective plate 10 to the roof 2 with the interposition of at least one support element 8 between the plate 10 and the respective body 1b. Each body 1b has lateral resting feet 4 with articulated bases 5 adapted to bear on the side edge portions of the roof 2. The height of the feet 4 relative to the body 1b may be adjusted when this is applied to the roof 2 by sliding along guide channels 4a formed in two opposite side faces of the body 1b so as to enable the bases 5 to fit perfectly on the surface of the roof 2. Clamping means 5a, for example constituted by a threaded shank with an outer operating knob 5b, pass through part of each foot 4, in correspondence with the respective channel 4a, so as to enable them to be clamped with one end against the body 1b and thus prevent the feet 4 from moving relative to the body 1b. The upper surface of each body 1b has retaining means of known type, for example constituted by holes 1c, for allowing the fixing of accessories such as ski-clamps or clamp members of various types.

The present variant enables the height, in particular, of the transport apparatus to be reduced considerably and enables the load carried by the apparatus to be brought closer to the roof 2 so as to minimise its overall frontal surface, all to the advantage of reducing the aerodynamic resistance of the apparatus during movement of the motor vehicle to which it is fitted.

In order to fix this variant of the transport apparatus to the roof 2, it will thus suffice to place, for example, a pair of the bodies 1b on two regions of the roof 2 and to adjust the height of the feet 4, these being clamped by the clamping means 5a by the screwing of the threaded shanks by means of their respective operating knobs 5b in the positions in which the bases 5 bear against the surface of the roof.

Naturally, the scope of the present invention extends to models which achieve equal utility by using the same innovative concept. For example, the anchoring blocks 7 may be connected releasably to the cross-members 3 or may be connected permanently thereto.

What is claimed is:

1. Carrier apparatus for the transport of articles on the roof of a motor vehicle, comprising:
   a support structure having feet for resting on opposite side edge portions of the roof,
   at least one magnetic plate adapted to be applied to the roof intermediate said feet, at least one retaining member mounted on said plate and engaging said support structure to retain said support structure on said roof and at least one load bearing member positioned between said retaining member and said plate whereby said bearing member enables substantially without a load transmission to the carrier to be transferred to the roof substantially through said feet.

2. Apparatus according to claim 1, wherein said support structure defines a first axis and is adapted to fit on said motor-vehicle roof with said first axis extending transverse said roof and wherein each said resting foot has a base articulated thereto about an axis substantially perpendicular to said first axis.

3. Apparatus according to claim 2, wherein said support structure is a bar adapted to extend transversely of said motor-vehicle roof and defining said first axis.

4. Apparatus according to claim 3, wherein each said at least one retaining member is connected releasably to said bar.

5. Apparatus according to claim 3, wherein each said at least one retaining member is connected to its associated magnetic plate at at least two points on opposite sides of said bar.

6. Apparatus according to claim 3, wherein each said at least one magnetic plate has an associated pair of said retaining members intended to be located side-by-side along said bar.

7. Apparatus according to claim 3, wherein each said bar has an associated pair of said magnetic plates.

8. Apparatus according to claim 1, wherein said support structure comprises a body shaped substantially as a half-shell.

9. Apparatus according to claim 8, wherein it further includes adjustment means for adjusting the height of said resting feet relative to said body.

10. Apparatus according to claim 8, wherein said body includes means for retaining articles to be transported, thereon in use.

11. Apparatus according to claim 1, wherein each said at least one retaining member is connected resiliently to the respective said at least one magnetic plate.

12. A carrier unit for the transport of articles on the roof of a motor-vehicle, including at least two support structures, wherein each said support structure includes at least one magnetic plate having at least one retaining member mounted thereon, at least one load bearing member positioned between said retaining member and said plate, and feet for bearing on opposite side edge portions of the roof, whereby each of said support structures is retained on said roof by means of said retaining member on said at least one magnetic plate while the load bearing member enables a load of the articles transported by said support structures to be transmitted to the roof substantially only through said resting feet.

* * * * *